United States Patent [19]
David et al.

[11] Patent Number: 5,474,031
[45] Date of Patent: Dec. 12, 1995

[54] BIRD TOY HANGER

[76] Inventors: Patricia R. David; Gregory J. David, both of 11022 N. Main, Rockton, Ill. 61072

[21] Appl. No.: 83,299

[22] Filed: Jun. 29, 1993

[51] Int. Cl.[6] ................................................. A01K 29/00
[52] U.S. Cl. .......................................................... 119/708
[58] Field of Search ........................... 119/700, 702, 119/707, 708, 24, 26; 248/925; 182/3; D11/121

[56] References Cited

U.S. PATENT DOCUMENTS

| | | | |
|---|---|---|---|
| 1,661,084 | 2/1928 | Palubiak | 119/26 |
| 2,720,188 | 10/1955 | Hofrichter | 119/26 |
| 2,807,859 | 10/1957 | Pearce et al. | D11/121 X |
| 3,018,362 | 1/1962 | Joyce | D11/121 X |
| 3,459,158 | 8/1969 | Mitchell, Jr. | 119/208 |
| 5,148,769 | 9/1992 | Zelinger | 119/708 |

*Primary Examiner*—Gene Mancene
*Assistant Examiner*—Thomas Price

[57] ABSTRACT

A hanger for preventing the removal of toys and chewable items by caged birds, including a sphere on the outside of the cage and the wire hanger holding items inside the cage. The sphere is large enough not to be pulled through the space between the cage bars, and the hanger supporting the toys or chewable items, is removably suspended from the sphere. The hanger will not allow the bird to pull these items further into the cage or remove the hanger allowing all items to drop into waste on the cage bottom.

3 Claims, 2 Drawing Sheets

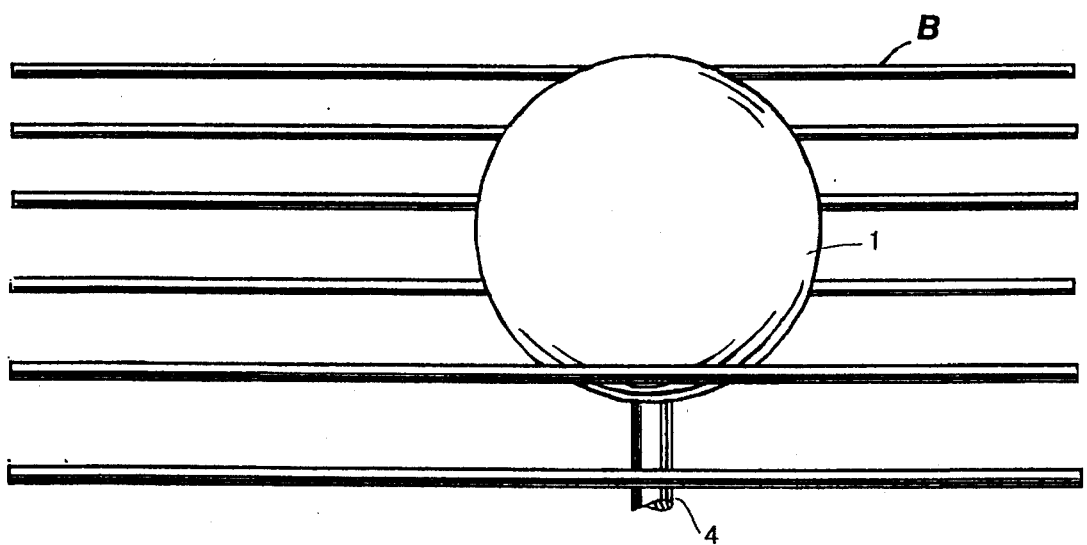

BIRD TOY HANGER

BACKGROUND OF THE INVENTION

1. Field of the Invention

The invention relates generally to an improved and safer way to hang bird toys in cages.

2. Description of Prior Art

Traditionaly bird toys have been hung with padlocks which require a key for removal and scratch the paint off the cage or chain repair links which are ineffective because birds are able to unscrew them and remove the toy allowing the toy to be destroyed or dropped to the cage bottom and into bird waste. Since chain repair links are not intended for this use, they can be dangerous in the respect that once the bird has unscrewed the chain repair link, the opening in the link leaves a place for the bird to get their beak caught.

SUMMARY OF THE INVENTION

The invention is a design that allows toys and chewable items to be hung in a bird cage without possibility of their removal by the bird and, letting them fall into the waste on the cage bottom. Because this invention requires the size of the sphere or half sphere to be large enough to prevent it from being pulled through the spaces between the cage bars, this large size also makes removal and destruction of the sphere or half sphere by a bird virtually impossible even if the bird is allowed out on top of the cage.

The object of this invention is to provide a safe and effective way to hang bird toys and chewable items.

BRIEF DESCRIPTION OF THE DRAWINGS

FIG. 5 is a view illustrating the invention as it would hang through the top bars of the bird cage, with the sphere on the outside of the cage and the portion that would hold toys or chewable items hanging downward inside the cage.

DESCRIPTION OF THE PREFERRED EMBODIMENT

Figure 1:
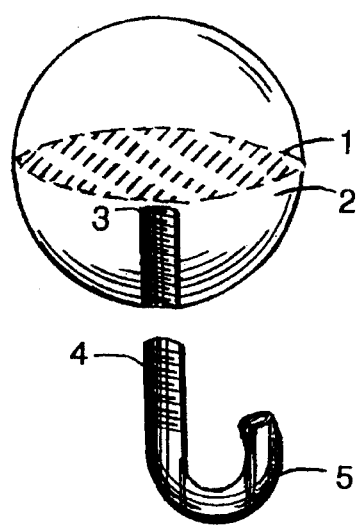
FIG. 1 is a front view of the Bird Toy and Sphere Hanger.
Figure 3:
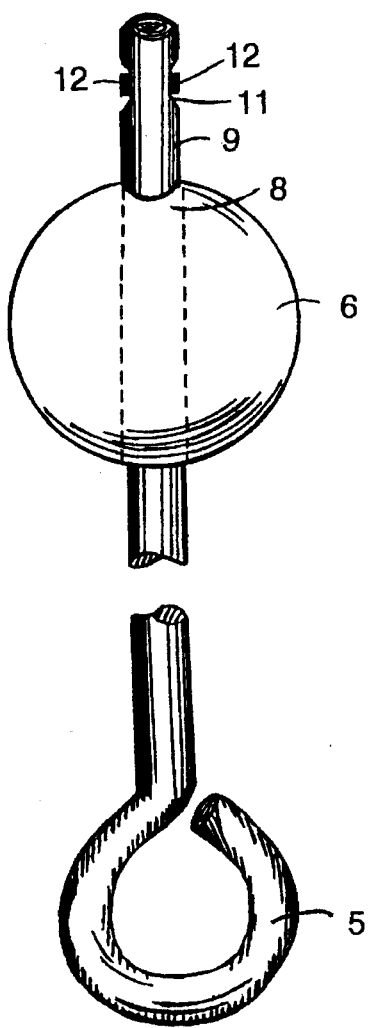
FIGS. 2, 3 and 4 are views showing other embodiments of the invention.
Figure 2:
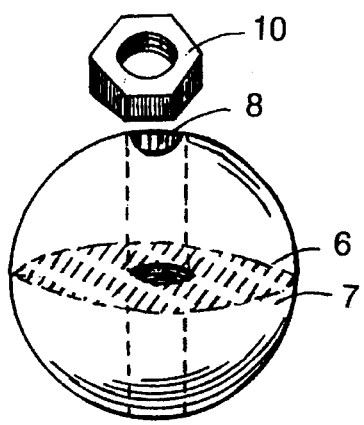
Figure 4:
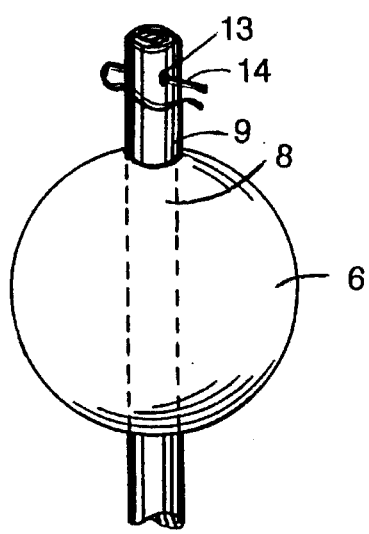

Refering to FIGS. 1 through 5, the embodiments of the Bird Toy and Sphere Hanger are shown.

In these embodiments, a sphere 1 or half sphere 2 is attached to the toy hanger 5 made of metal or other durable material, with the sphere resting between the top bars B on the outside of the cage, and the sphere 1 or half sphere 2 being wider in diameter than the space between the cage bars, preventing the sphere 1 or half sphere 2 from being pulled through the bars and into the cage by the bird. The sphere 1 or half sphere 2, can be of any material strong enough to withstand powerful beaks of large birds. The half sphere 2 would be attached to the hanger 5 with the round side towards the cage bars allowing free movement of the entire hanger assembly. The hanger 5 can be in many different shapes and sizes to hold a variety of different items, that would hang down inside the cage for entertaining the bird.

Any means of removably attaching the hanger 5 to the sphere 1 or half sphere 2 may be used, including the hanger 5 being threaded on one end 4 and screwing it into a tapped hole 3 in the sphere 1 or half sphere 2. Other means for attaching the hanger 5 to the sphere 6 or half sphere 7 may include pushing a long end of the hanger 5 through a hole 8 in the sphere 6 or half sphere 7 and fastening it on the opposite side of the sphere 6 or half sphere 7 not allowing the caged bird access to the fastener. This may be accomplished by using nuts 10 on a threaded end 4 of the hanger 5, clips 12 on a notched end 11 of the hanger, or a pin 14 through a hole 13 in one end of the hanger, or many other means.

The Bird Toy and Sphere Hanger can be manufactured and marketed as a product to be used with other toys that are available such as, food, wood, and other chewable items with a hole in them allowing the item to be slid onto the hanger 5 prior to attaching the sphere 1, sphere 6, half sphere 2, or half sphere 7 or as singular items such as a swing or a toy that fastens directly to the sphere 1, sphere 6, half sphere 2 or half sphere 7.

All of the embodiments of this invention would function to safely hang bird toys so that they can not be removed by the bird.

We claim:

1. A bird toy device in combination with adjacently positioned bars of a bird cage for hanging toys and chewable items, comprising:

a sphere of sufficient size to limit movement through a space between said bars, as the sphere is resting on said bird cage, a hanger having a bent-like shape about one end extends through said space for holding said toys and said items and including an other end fastened to said sphere, means for removably fastening said sphere to said other end of the hanger.

2. A bird toy device as recited in claim 1, in which said fastening means including a threaded end about said other end.

3. A bird toy device as recited in claim 2, said fastening means further including a tapped hole in said body to receive said threaded end.

\* \* \* \* \*